US010968681B2

(12) United States Patent
Schmider et al.

(10) Patent No.: US 10,968,681 B2
(45) **Date of Patent: *Apr. 6, 2021**

(54) SMART LOCKER SYSTEM

(71) Applicant: SIGNIFI SOLUTIONS INC., Mississauga (CA)

(72) Inventors: John Paul Schmider, Scarborough (CA); Kieran Maguire, Everett (CA); Eloisa Vera, Mississauga (CA); Yong Suk Jin, Oakville (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/016,678

(22) Filed: Sep. 10, 2020

(65) Prior Publication Data

US 2020/0408028 A1 Dec. 31, 2020

Related U.S. Application Data

(63) Continuation-in-part of application No. 16/380,374, filed on Apr. 10, 2019, now Pat. No. 10,799,051.

(Continued)

(51) Int. Cl.

| | |
|---|---|
| ***B60R 25/00*** | (2013.01) |
| ***G05B 19/00*** | (2006.01) |
| ***G05B 23/00*** | (2006.01) |
| ***G06F 7/00*** | (2006.01) |
| ***G06F 7/04*** | (2006.01) |
| ***G08B 29/00*** | (2006.01) |
| ***G08C 19/00*** | (2006.01) |
| ***H04B 1/00*** | (2006.01) |
| ***H04B 3/00*** | (2006.01) |
| ***H04Q 1/00*** | (2006.01) |
| ***H04Q 9/00*** | (2006.01) |
| ***E05G 1/08*** | (2006.01) |
| ***A47B 47/00*** | (2006.01) |
| ***A47B 87/00*** | (2006.01) |
| ***E05G 1/024*** | (2006.01) |
| *G07C 9/00* | (2020.01) |
| *G07C 9/21* | (2020.01) |
| *G07C 9/25* | (2020.01) |

(52) U.S. Cl.

CPC ............ *E05G 1/08* (2013.01); *A47B 47/0091* (2013.01); *A47B 87/008* (2013.01); *E05G 1/024* (2013.01); *G07C 9/00896* (2013.01); *G07C 9/21* (2020.01); *G07C 9/253* (2020.01)

(58) Field of Classification Search

CPC ....... E05G 1/08; E05G 1/024; A47B 47/0091; A47B 87/008; G07C 9/00896; G07C 9/21; G07C 9/253

USPC ........................................................ 340/5.73

See application file for complete search history.

(56) References Cited

U.S. PATENT DOCUMENTS 10,799,051 B2 * 10/2020 Schmider ............... G07C 9/253

* cited by examiner

*Primary Examiner* — Tanmay K Shah

(74) *Attorney, Agent, or Firm* — Perry + Currier Inc.

(57) ABSTRACT

A smart locker system includes an enclosure unit and a cassette unit. The smart locker is extendable by adding additional enclosure units and the cassette units. The cassette unit includes storage bins and a control bin. The cassette unit contains different size of storage bins and a control bin. The smart locker system further includes a touch screen and authentication devices. The smart locker system can arrange the storage bins and the control bins to maintain the height of the smart locker system.

20 Claims, 18 Drawing Sheets

Related U.S. Application Data

(60) Provisional application No. 62/655,900, filed on Apr. 11, 2018.

SMART LOCKER SYSTEM

CROSS-REFERENCE TO RELATED APPLICATIONS

This application claims priority to U.S. Provisional Patent Application No. 62/655,900, filed Apr. 11, 2018, and is a continuation-in-part of U.S. patent application Ser. No. 16/380,374, filed Apr. 10, 2019, the entirety of which are incorporated herein by reference.

FIELD

The present invention is in the technical field of locker systems.

BACKGROUND

Lockers are common in public places such as schools, transportation hubs and companies. Most lockers are operated manually by using locks with physical keys. Recently the lockers evolve and expand their applications from parcel lockers to store pickup lockers using automated functions. There have been still requirements on security, rigidity, convenience and others in the market. Based on the requirements in the market, the lockers are under development to improve functions and designs.

SUMMARY

According to an aspect of the invention, a locker system includes at least one enclosure unit including at least one top wall, at least one back wall, at least one bottom wall and at least one side wall; at least one cassette unit coupled with the at least one enclosure unit, the at least one cassette unit comprising: at least one storage bin to store items, each storage bin including a front door and a lock device to secure the front door; and at least one control bin including a computing unit including at least one processor, the computing unit connected to an outside network and configured to: send a data signal to the lock device to open the front door; receive a response from a sensor switch at the lock device; when the response comprises a reverse data signal, identify an opening failure; and in response to identifying the opening failure, output an alert signal for an operator of the locker system.

According to an aspect of the invention, a method for operating a locker system includes in response to an access request, sending, from a computing device, a data signal to a lock device of a front door of a storage bin to open the front door; receiving a response from a sensor switch at the lock device; when the response comprises a reverse data signal, identifying an opening failure; and in response to identifying the opening failure, outputting an alert signal for an operator of the locker system.

DETAILED DESCRIPTION

A locker system was required to make extendable and adaptable with ease to customers' needs. Robustness, cost effectiveness and management efficiency were also considered to design a smart locker system. Accordingly, a smart locker is provided to meet the customer's needs or at least one disadvantage of the prior art.

In the following specification, the smart locker described herein generally comprises a cassette unit. In some embodiments, the cassette unit can include different kinds of separable bins which are individually separable from the cassette unit and/or combinable bins. Hence, the cassette unit and related common parts such as a front door are denoted without using different numberings between the separable bins and the combinable bins.

Figure 1:
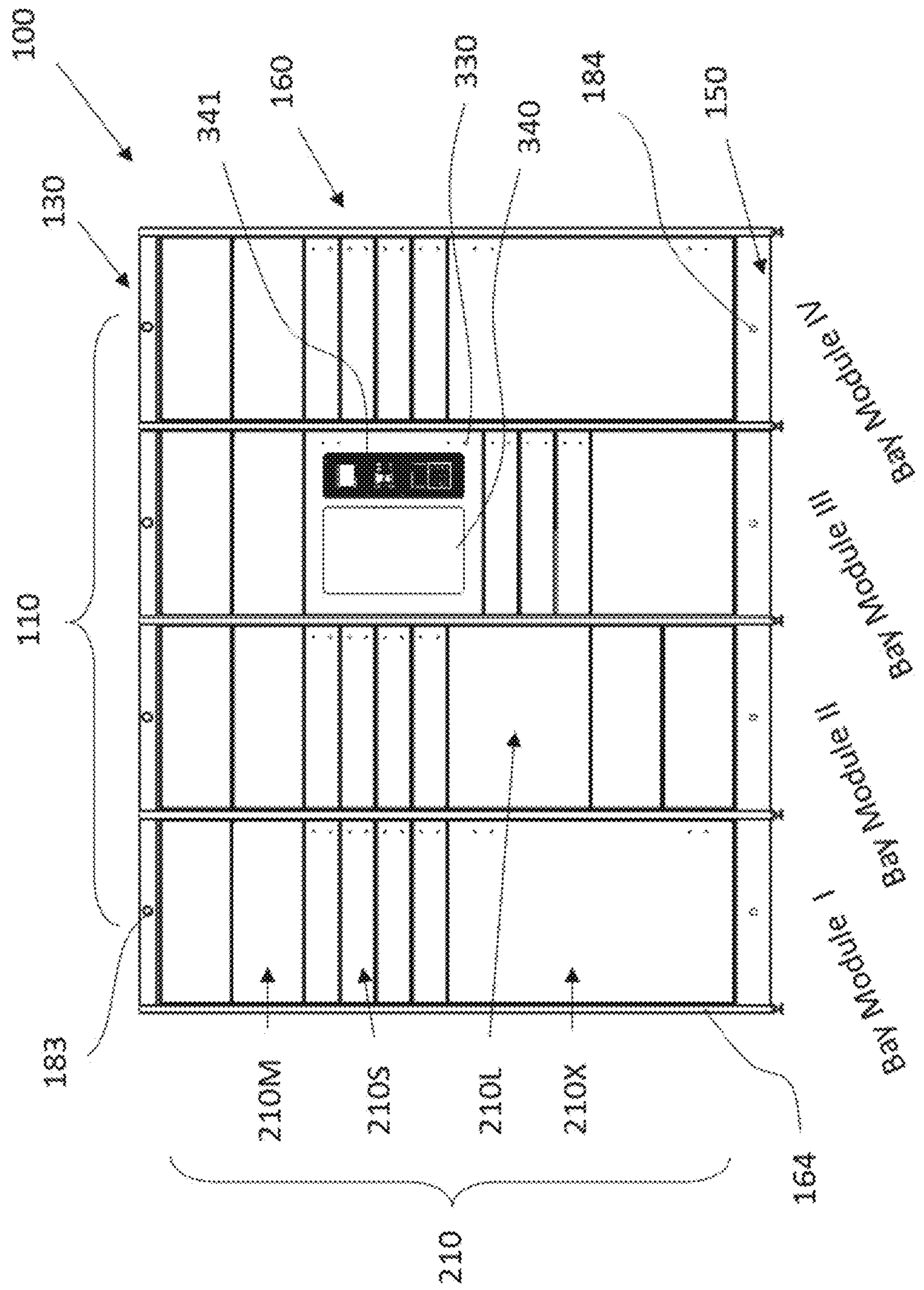
FIG. 1 is a front elevation view of a smart locker system, according to a non-limiting embodiment.

Referring to FIG. 1, a smart locker system 100 is shown, according to a non-limiting embodiment. The smart locker system 100 can be extended by adding bay modules 110. In the embodiment shown in FIG. 1, the smart locker includes four bay modules 110. The smart locker system 100 further includes an enclosure unit 120 and a cassette unit 200 (see FIG. 2 and FIG. 18). The enclosure unit 120 includes a top wall 130, a back wall 140, a bottom wall 150 and side walls 160.

In some embodiments, the smart locker system 100 can include environmental conditioning systems such as cooling or heating devices for temperature control (not shown) and can contain thermal insulation to maintain a relatively constant temperature inside the cassette units 200 or the enclosure unit 120.

The cassette unit 200 contains storage bins 210 and a control bin 330. Each bay module 110 can be configured with storage bins 210 and/or a control bin 330. The storage bins 210 can have different heights and can have different depths or widths (see 210S which denotes a storage bin 210 of small size, 210M which denotes a storage bin 210 of medium size, 210L which denotes a storage bin 210 of large size, and 210X which denotes a storage bin 210 of extra-large size).

The control bin 330 of the smart locker system 100 can include user an interface device such as a touch screen 340, a webcam, a speaker and the like. The smart locker system 100 can also include an authentication device 341 such as a card reader, an RFID reader, a barcode scanner, a fingerprint scanner, a palm vein scanner and the like. The authentication device 351 can be operated with the user interface device.

In some embodiments, the smart locker system 100 can contain printed signage or display devices on the surfaces of side walls 160 or the cassette unit 200 to show information about products, advertisements or operation guidance (not shown). The smart locker system 100 can include a display module configured to operate an information display on the display devices. The display devices can be light emitting diodes (LEDs), liquid crystal displays (LCDs), organic light-emitting diodes (OLEDs), projections or electrophoretic displays such as an electronic paper.

In some embodiments, the smart locker system 100 can include a camera 183 for surveillance or identifying users.

In some embodiments, the smart locker system 100 can include a key lock 184 to operate manually for emergency.

Figure 2:
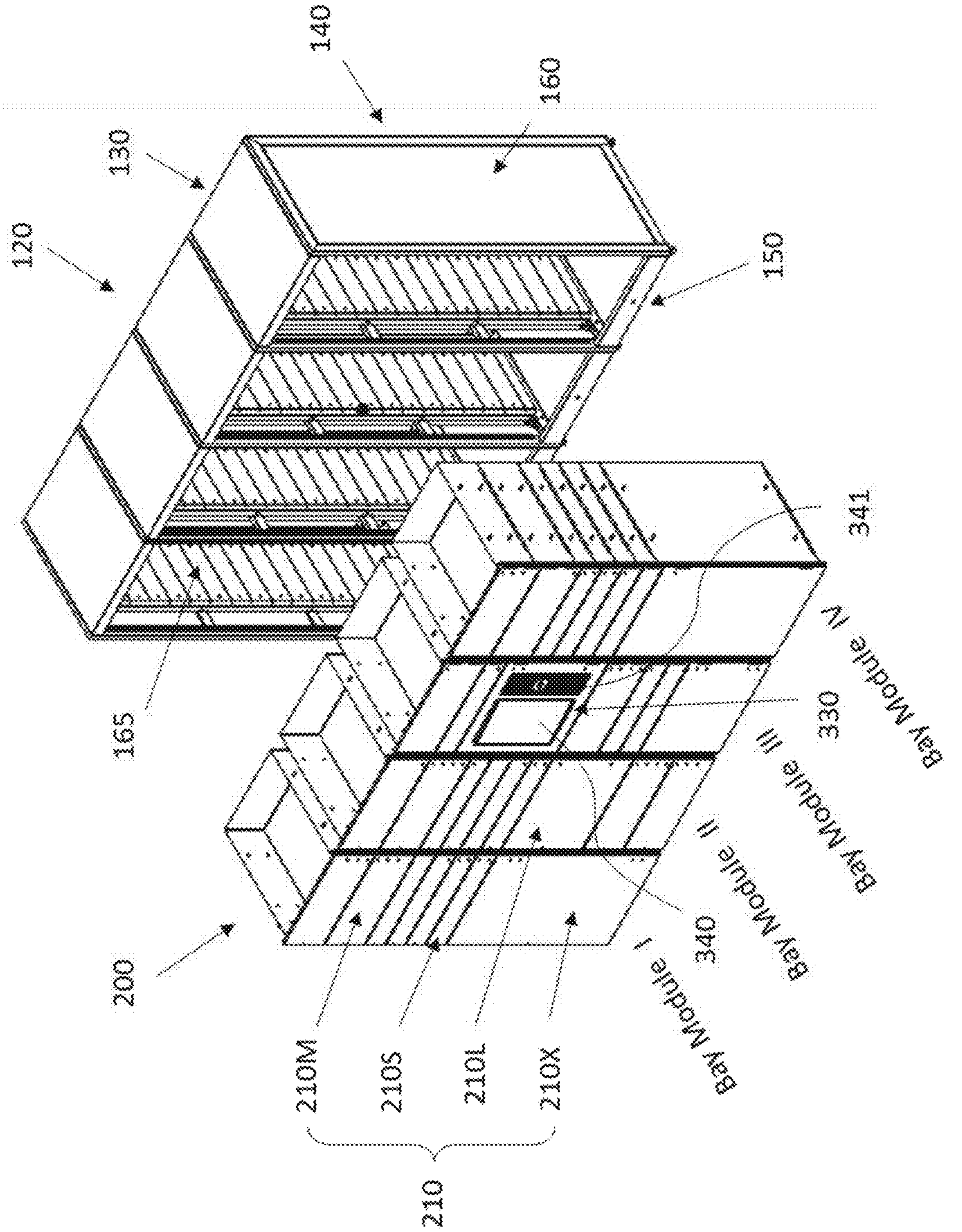
FIG. 2 is an exploded perspective view of a smart locker system with enclosure units and cassette units including separable bins, according to a non-limiting embodiment.

FIG. 2. shows a non-limiting embodiment of a smart locker system 100 with a cassette unit 200 including separable bins. The cassette unit 200 includes separable bins to accommodate configurations depending on customers' requirements. Most of the separable bins are storage bins 210 having different dimensions as explained in FIG. 1. The cassette unit 200 is assembled with the enclosure unit 120. In the embodiment shown from left to right in FIG. 2, bay module I contains four small storage bins 210S, two medium storage bins 210M and one extra-large storage bin 210X. Bay module II contains four small storage bins 210S, four medium storage bins 210M and one large storage bin 210L. Bay module III contains three small storage bins 210S, two medium storage bins 210M, one large storage bin 210L and one control bin 330. All the bay modules 110 may have the same height despite the different arrangements of storage bins 210.

In some embodiments, the control bin 330 can be placed apart from other bays. When there are requirements to allocate more than four bay modules, the bay module III including the control bin 330 can be placed apart from the other bays, considering users' efficient moving lines from the control bin 330 to the storage bins 210.

In some embodiments, the control bin 330 can form standalone feature from other bays. The control bin 330 can be configured to kiosk type without the storage bins 210. The control bin 330 can have thin and slim shape including user interface devices and computing unit because the storage bins 210 are skipped.

In some embodiments, the heights of the storage bins 210 may be about 4",8", 16" and 32" for the small storage bin 210S, the medium storage bin 210M, the large storage bin 210L and extra-large storage bin 210X respectively. The height of the control bin 330 may be 20". Thus, in such embodiments, the heights of the storage bins 210 and the control bin 330 are the multiples of 4. The height of each bay module 110 may thereby be maintained constant, such as at 64", by stacking each storage bin 210 in the cassette unit 300. Thus, the height of the storage bins may be multiples of one another so that the space occupied by any higher storage bin may be filled by a combination of lower storage bins. In other embodiments, different dimensions of storage bins 210 may be used. Other dimensions are contemplated.

In some embodiments, the width and depth of the storage bins 210 may be sized to fill the depth of the cassette unit 200. For example, the width and depth of the storage bins 210 may be 18" and 28" respectively. In other embodiments, different storage bins 210 may have different depths. For example, the small storage bin 210S can be shallower than other cassettes to provide easy access to a small item. Other dimensions are contemplated.

The storage bins 210 or the control bins 330 can be placed at convenient locations for the purposes of users. For example, to comply with various legislative regimes which stipulate accessibility requirements, such as the ADA (the Americans with Disabilities Act), a control bin 330 can be placed at a height between 48 inches and 15 inches.

Figure 3:
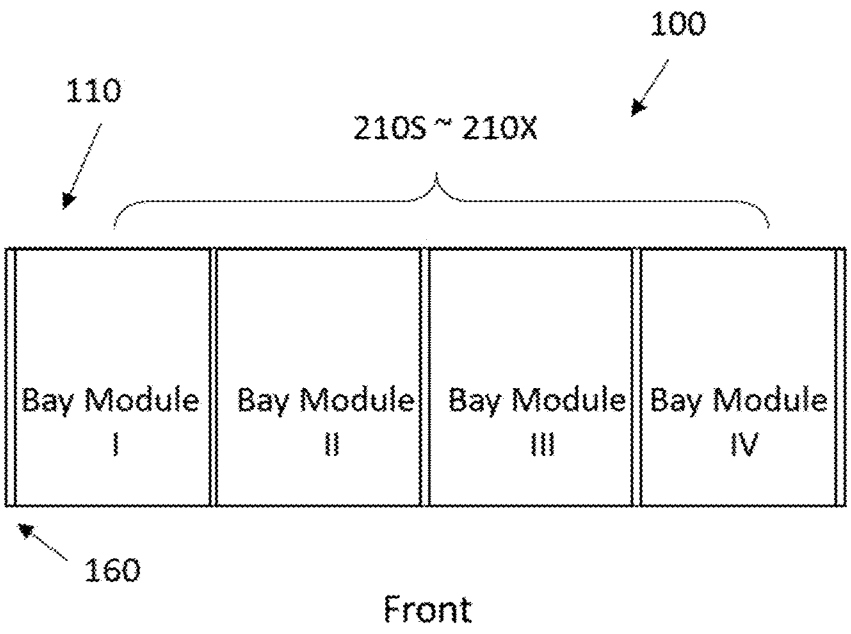
FIG. 3 is a top plan view of an arrangement of cassette units in bay modules, the cassette units having the same widths and depths, according to a non-limiting embodiment.
Figure 4:
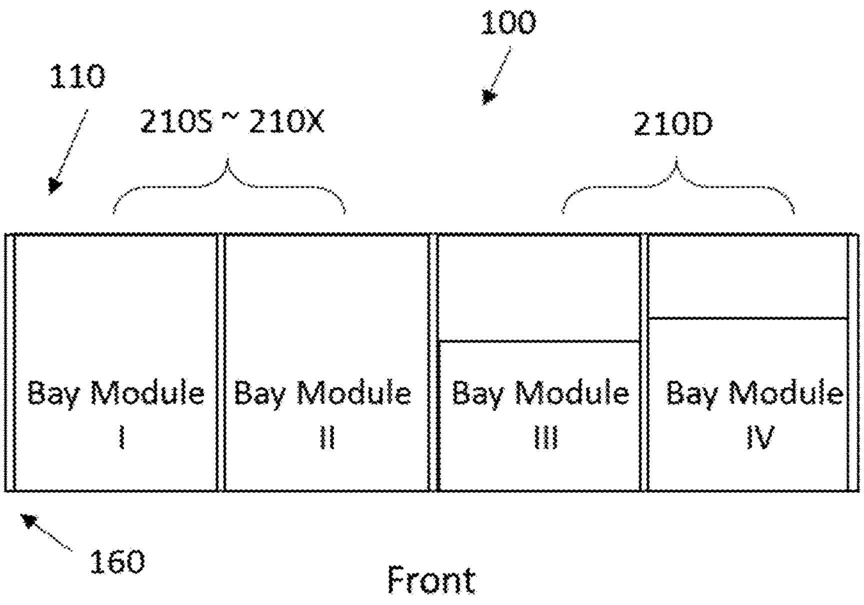
FIG. 4 is a top plan view of an arrangement of cassette units in bay modules, the cassette units having different depths, according to a non-limiting embodiment.
Figure 5:
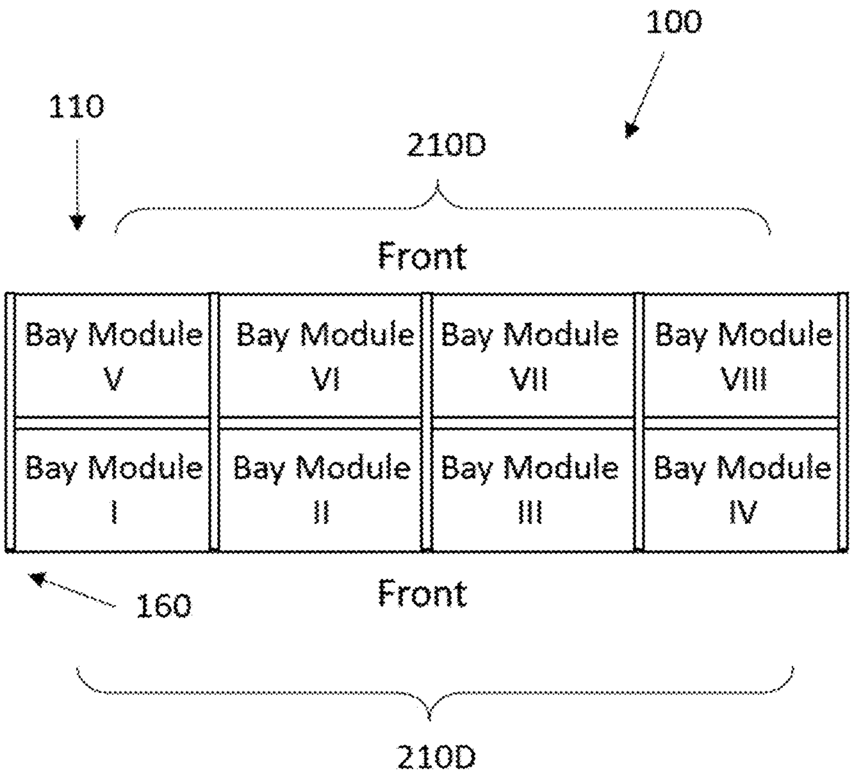
FIG. 5 is a top plan view of an arrangement of cassette units providing two front faces for user interaction, according to a non-limiting embodiment.

FIGS. 3-5 show non-limiting embodiments of different arrangements of cassette units 200.

Referring to FIG. 3, the smart locker system 100 holds four bay modules 110 and the four bay modules 110 contain the storage bins 210 with the same width and depth. The smart locker system 100 has a single front face for operations.

Referring to FIG. 4, the smart locker system 100 holds four bay modules 110. From the four bay modules, the bay modules, I and II contain the storage bins 210 with the same width and depth but the bay modules, I land IV contain storage bins 210D with different depths. The smart locker system 100 has a single front face for operations.

Referring to FIG. 5, the smart locker system 100 holds eight bay modules 110 and the eight bay modules 110 contain storage bins 210D with the same width and depth. One half of the eight bay modules 110 stand facing in one direction, and the other half of the eight bay modules 110 stand facing the opposite direction, providing two front faces for user interaction.

In various embodiments, the bay modules 110 with the storage bins 210D can share side walls 160. For example, bay module I and bay module V can share the side wall 160 inside the bays.

In addition to the embodiments described at FIGS. 3-5, there may exist several variations of bay module 110 arrangement.

Figure 6:
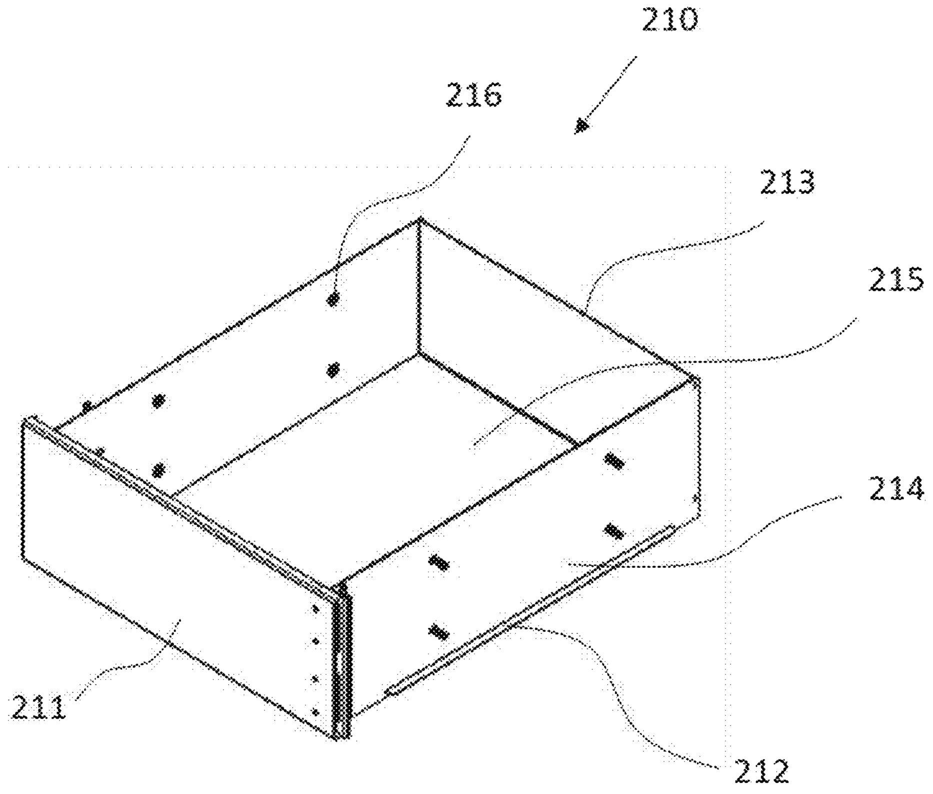
FIG. 6 is a perspective view of a storage bin, the storage bin being separated from the other bins, according to a non-limiting embodiment.
Figure 7:
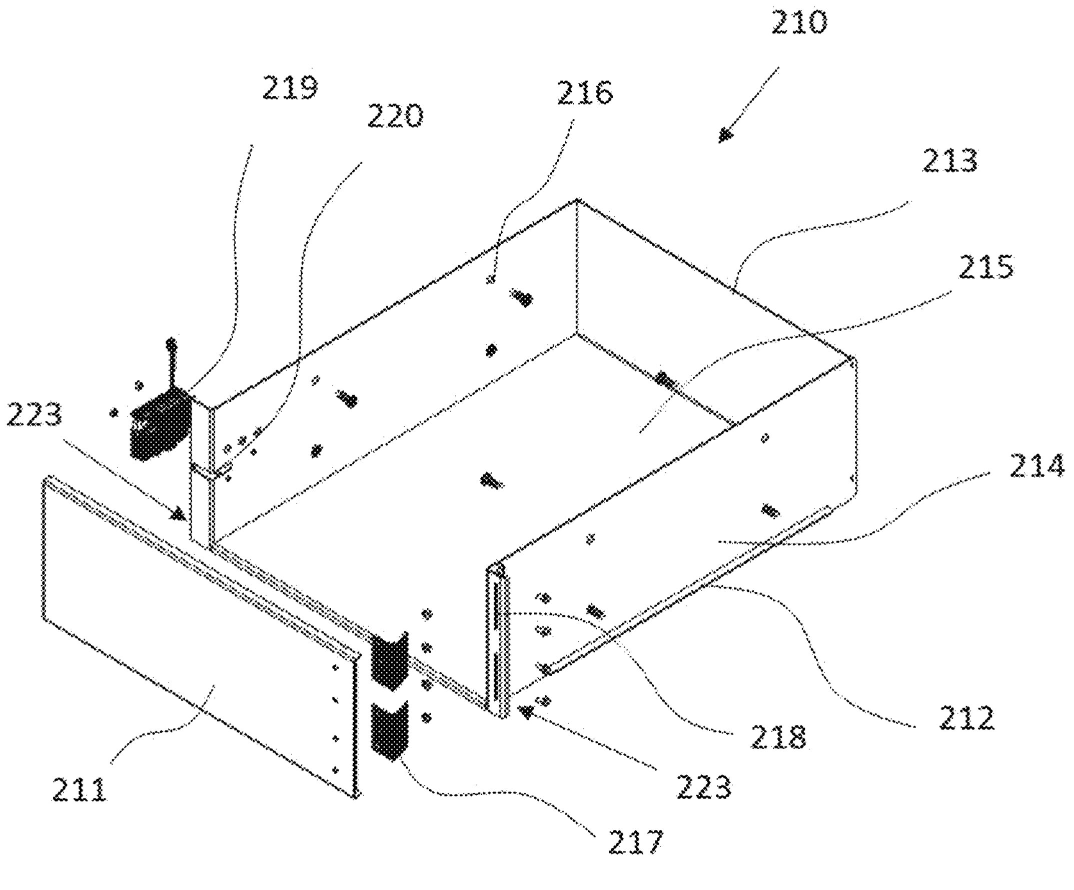
FIG. 7 is an exploded perspective view of a storage bin, the storage bin being separated from the other bins, according to a non-limiting embodiment.

FIGS. 6 and 7 show a structure of a separable storage bin 210, according to a non-limiting embodiment. The separable storage bin 210 includes a front door 211, side wings 212, a back plate 213, side plates 214 and a base plate 215. Side holes 216 can be installed to hold the separable storage bin 210 securely with elements such as bolts, screws, pins, springs and the like. A hinge 317 (FIG. 7) combines the front door 211 and one of the side plates 214 through a hinge slot 218. The side plates 214 can have side plate brackets 223 including the hinge slot 218 and a latch slot 220. A latch 219 is installed on the side plate 214 which is aligned with the latch slot 220 to lock the front door 211 with a door striker bracket 221 (see FIG. 10). That is, the latch 219 interfaces with the door striker bracket 221 to lock the front door 211. The latch 219 can have a releasing knob to manually release locking from the door striker bracket 221. When the releasing knob is lifted, the latch 219 is released by a spring mechanism therein.

Figure 17:
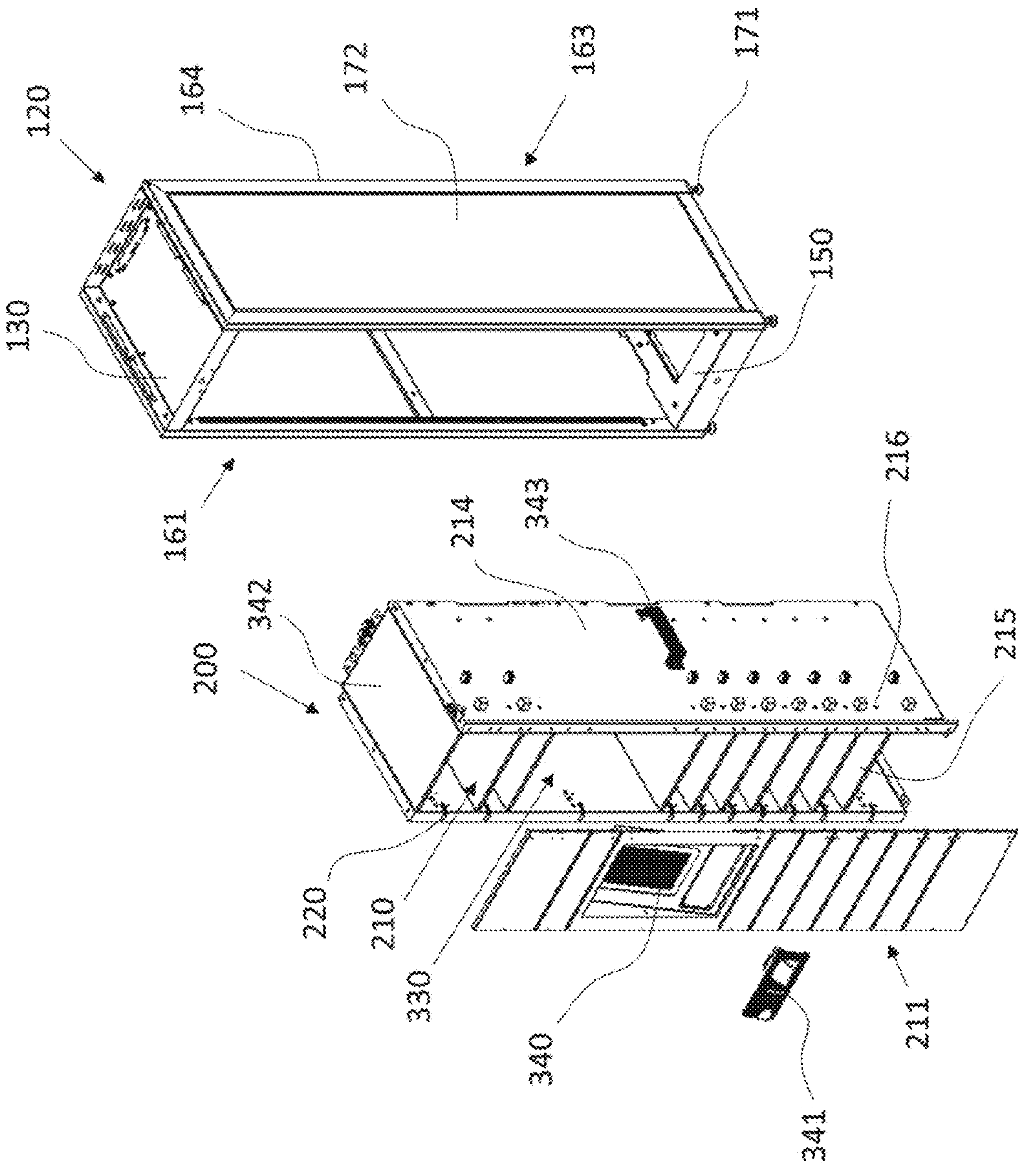
FIG. 17 is an exploded perspective view of a smart locker system accommodating a cassette unit with combinable bins, according to a non-limiting embodiment.

In addition to the embodiments described at FIGS. 6-7, there may exist a top plate 342 (as shown at FIG. 17) to cover the storage bin 210.

The separable storage bin 210 can include sensors to detect or identify an item inside. In some embodiments, an RFID reader is installed inside the storage bin and can identify an item with RFID tag. The RFID reader and the RFID tag depend on items to be store inside the separable storage bin 210.

When the items are metallic, RFID tag on metal can be used to secure detection. The RFID reader can be installed as contact type combined with RFID antenna or remote type with separated RFID antenna.

In some embodiments, the separable storage bin 210 can include a contact or non-contact charger to charge mobile devices. The separable storage bin 210 can include a connection port for power or data. For example, when storing a mobile device, the mobile device can be connected to power or data connections such as USB or other ports. The mobile device can be charged or checked for the status thereof such as memory capacity, processor capability, software defects and others.

Certain mobile device consuming power may emit heat in the storage bin 210. For example, 150 W laptop can emit and make heat more than 40 C° in the storage bin 210. When multiple laptops are placed to each storage bin 210. It makes heat buildup around 70 C°. The unwanted heat buildup may hinder processor performance and shorten battery life span. To prevent the unwanted heat buildup and maintain less than around 30 C°, the locker system 100 may include an environmental conditioning system. The environmental conditioning system may support conditioning across the entire locker system 100, and/or may also include environmental conditioning units associated with each separable storage bin 210. For example, each separable storage bin 210 can accommodate cooling structures and cooling devices such as air flow holes, louvers, temperature sensors, cooling fans and thermoelectric devices.

In some embodiments, the separable storage bin 210 can further include air flow holes to maintain constant temperature such as refrigeration with insulation from outside or the other storage bins In some embodiments, the separable storage bin 210 can include sensors to detect temperatures inside. The sensors to detect temperatures are associated with a temperature controller. The temperature controller can be installed at the control bin 330. The temperature controller can also be connected to a network to monitor temperatures through the control bin 330. The temperatures can be single or several settings depending on customers' requirements.

In some embodiments, the separable storage bin 210 can include thermoelectric devices such as a Peltier module. The Peltier module can be used for cooling or warming inside of the separable storage bin 210 based on temperature settings. The Peltier module can be mounted on the back plate 213 to exchange heat between inside and outside of the separable storage bin 210 effectively. The Peltier module can include metal pin structure with fans to accelerate the heat exchange. The back plate 213 can include socket structure to connect to a power plug, aligned with the socket structure. In some examples, the separable storage bin 210 may further include insulated plates to maintain the temperature within the separable storage bin 210.

In some embodiments, when the separable storage bin 210 is enclosed with the top plate 342, the base plate 215 and side plates 214, the separable storage bin 210 can include vent components to control dust and moisture in the separable storage bin 210. For example, the vent components can include a gasket and an air flow membrane consisting of PTFE (Polytetrafluoroethylene) to control air pressure, dusts and moisture from outside environment.

In some embodiments, the separable storage bin 210 can include a drain to drain condensation from the separable storage bin 210. For example, the drain may be included in the base plate 215.

In some embodiments, the separable storage bin 210 can include illumination devices such as LEDs. LED lighting can illuminate to indicate pick up location. The LED lighting can also illuminate items inside the separable storage bin 210 when the front door 311 is open. The LED lighting can include LED modules or LED strips which contain multiple LEDs to be controlled individually by a microcontroller. The microcontroller can control each LED in the LED strips digitally. Therefore, the microcontroller can control RGB (Red/Green/Blue) LEDs in the LED strips to illuminate each storage bin 210 at selected location. The microcontroller can adjust the color and the intensity of RGB LEDs as well to display various status such as alert and temperature.

In some embodiments, the separable storage bin 210 can include sanitization devices configured to sanitize the interior of the separable storage bin 210. The sanitation device may be configured to turn off in response to the front door 211 opening. For example, UV-C LED lighting can sanitize items inside of the separable storage bin 210 for designated time interval. When the front door 211 is open, the UV-C LED lighting is turned off for safety. The UV-C LED lighting can be operated by a latch controller. That is, the latch controller may control the UV-C LED light to turn on to sanitize the interior of the separable storage bin 210 when the front door 211 is closed, and control the UV-C LED light to turn off when the front door 211 is opened (i.e., turn the UV-C LED light off simultaneously with unlocking or opening the front door 211.

In some embodiments, the separable storage bin 210 can accommodate transparent portion on the front door 211 to show items inside easily.

In some embodiments, the separable storage bin 210 may be provided without the back plate 213 for purposes such as temperature control or device installation.

In some embodiments, the storage bin 210 can further include a top plate or a support bar to sustain the separable storage bin 210 rigidly.

Figure 8:
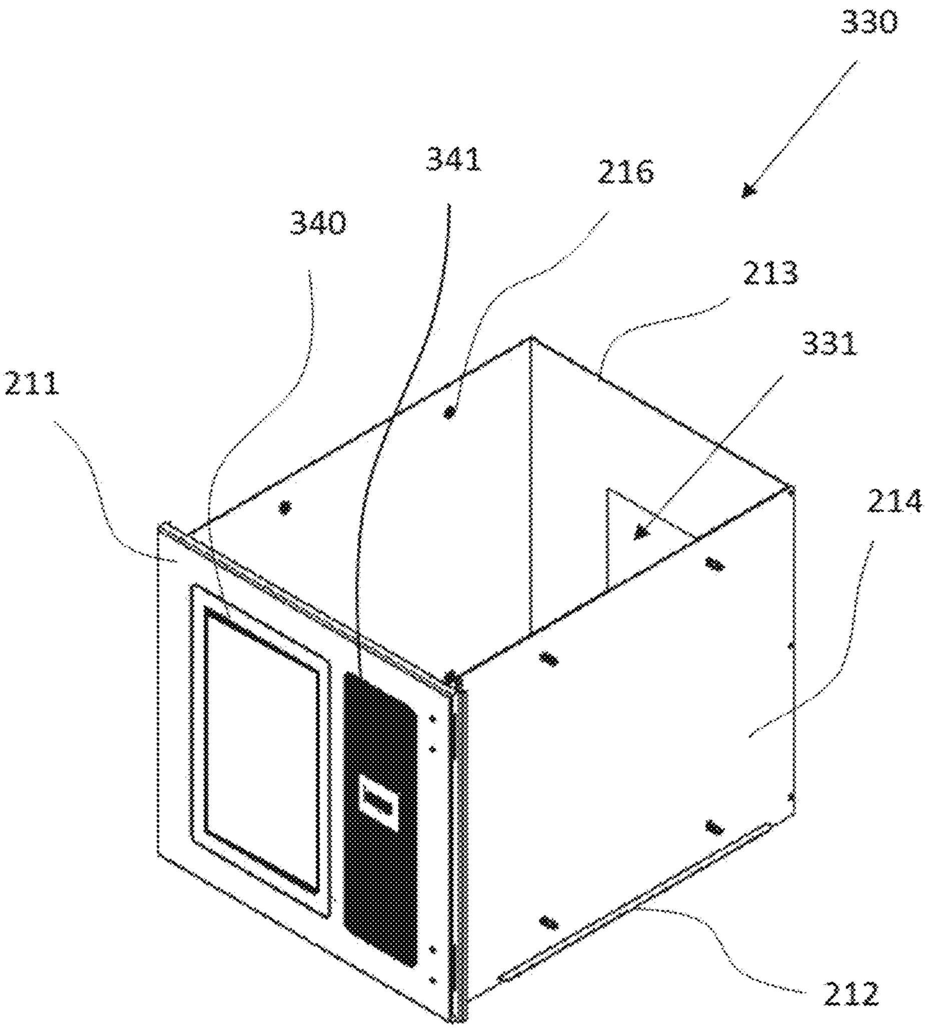
FIG. 8 is a perspective view of a control bin, the control bin being separated from the other bins, according to a non-limiting embodiment.
Figure 9:
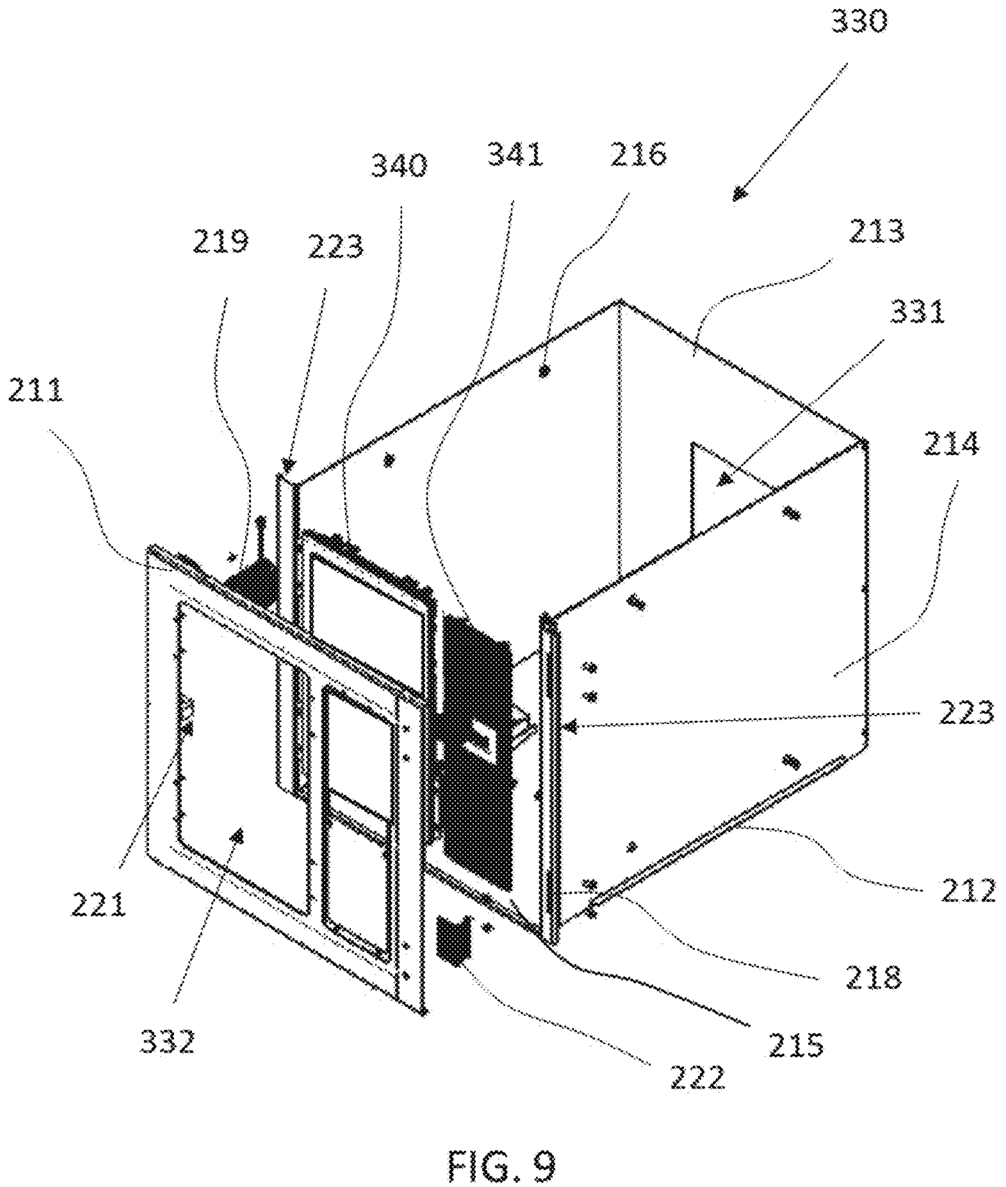
FIG. 9 is an exploded perspective view of a control bin, the control bin being separated from the other bins, according to a non-limiting embodiment.

FIGS. 8 and 9 show a structure of a separable control bin 330 separated from the other bins, according to a non-limiting embodiment. The separable control bin 330 includes a front door 211, side wings 212, a back plate 213, side plates 214 and a base plate 215. Side holes 216 can be installed to hold the separable control bin 330 securely with elements such as bolts, screws, pins, springs and the likes. A door hinge 217 combines the front door 211 and one of the side plates 214 through a hinge slot 218. The side plates 214 can have side plate brackets 223 including the hinge slot 218 and a latch slot (not shown but see latch slot 220 in FIG. 7). A latch 219 is installed on the side plate 214 which is aligned with the latch slot 220 to lock the front door 211 with a door striker bracket 221.

Most features of the separable control bin 330 are similar to those of the separable storage bin 210, and only differences between the separable control bin 330 and separable storage bin 210 will be described in detail. The separable control bin 330 can include user interface devices such as a touch screen 340, authentication devices 341 and a computing unit (not shown). The separable control bin 330 can have front door cutout 332 to include the touch screen 340 or authentication devices 341. The separable control bin 330 can also have backplate cutout 331 to accommodate wirings for power and data.

The computing unit can have one or more processors, memories, and communication devices for facilitating its operation and for interfacing with other components of the smart locker system 100. The term "processor" as discussed herein refers to any quantity and combination of a processor, a central processing units (CPU), a microprocessor, a microcontroller, a field-programmable gate array (FPGA), and similar. The memory of the computing unit may comprise volatile storage, non-volatile storage, or a combination, such as random-access memory (RAM), read-only memory (ROM), flash memory, optical storage, magnetic storage, and similar.

The computing unit can control the front door 211 opening and make an alert for opening failures. When a user requests an item using the touch screen 340, the computing unit sends a data signal to the latch 219 (or other suitable lock device of the front door) through a latch controller to open the front door. The data signal may be a predefined data signal designated to represent an unlocking or an opening of the front door 211. In response to receiving the data signal, the latch controller may release the latch 219 from the door striker bracket 221 to open the front door 211.

The front door 211 may also be associated with a sensor switch at the latch 219 (or other suitable lock device of the front door). The sensor switch may be configured to sense a data signal at the latch 219 based on the locked/unlocked status of the front door 211. For example, when the latch 219 is released from the door striker bracket 221, and the front door 211 is opened, the sensor switch may detect the data signal issued by the computing unit to open the front door (i.e., because the front door 211 has been opened, the sensor switch may dearly detect the data signal issued by the computing unit with high reception). In contrast, when the latch 219 fails to release from the door striker bracket 221, and the front door 211 remains locked or dosed, the sensor switch may detect a reverse data signal (e.g., a low reception of the data signal issued by the computing unit because the front door 211 is obstructing detection of the data signal by the sensor switch). As will be appreciated, in other examples, the data signal to open the front door 211 and reverse data signal may be different data signals (e.g., as opposed to high and low reception of the same data signal).

The sensor switch may then send a response to the computing unit, indicating the data signal detected. When the response is the data signal, the computing unit determines that the front door 211 has opened, and stops sending the data signal. When the response is the reverse data signal, the computing unit identifies an opening failure. In response to identifying the opening failure, the computing unit may output an alert signal for an operator of the locker system 100. In other examples, prior to outputting the alert signal, in response to identifying the opening failure, the computing unit may send a further data signal to the latch 219 to open the front door. The further data signal may be the same data signal to open to front door, sent by the computing unit continuously. The computing unit may continue to send the data signal to the latch for a designated time. When the designated time has expired, the computing unit may then output the alert signal. Therefore, the computing unit can monitor door opening status communicating with the latches 219 through the latch controller.

In some embodiments, the latch controller can operate the LED lightings (or other lighting unit) and the latches 219 through a single controller. For example, when the latch is released to open the front door 221, the LED lighting illuminates items inside the separable storage bin 210. On the contrary, the LED lighting with UV-C for sanitization is turned off when the latch is released to open the front door 221. Therefore, the latch controller can control LED lightings for illumination and/or sanitization.

The computing unit can communicate with external systems, such as network systems, over one or more computer networks, which can include the internet, a Wi-Fi network, a local-area network (LAN), a wide-area network (WAN), a virtual private network (VPN), a combination of such, and similar. The computing unit can extend or distribute the memory therein through communicating with the external systems. The smart locker system 100 can be connected to the external system and controlled in a remote control location such as a remote control server. It is to be understood that a remote control server may refer to a single computing device or a plurality of computing devices.

In addition to the embodiments described at FIGS. 8-9, there may exist a top plate 342 (as shown at FIG. 17) to cover the control bin 330.

In some embodiments, when the smart locker is used for outdoor applications, the control bin 330 may insulated from outside environment conditions such as temperature, humidity or dusts to secure normal operations of devices including processor, display device and battery. For example, the control bin 330 may have proper IP (International Protection Marking) or NEMA (National Electrical Manufacturers Association) Enclosure Type Ratings such as IP 65 or NEMA 4 to protect against dusts and water ingress from outside. The control bin 330 may include gaskets around the front door 211. The front door cutout 332 and the backplate cutout 331 may install gaskets to meet proper Enclosure Type Ratings.

Figure 10:
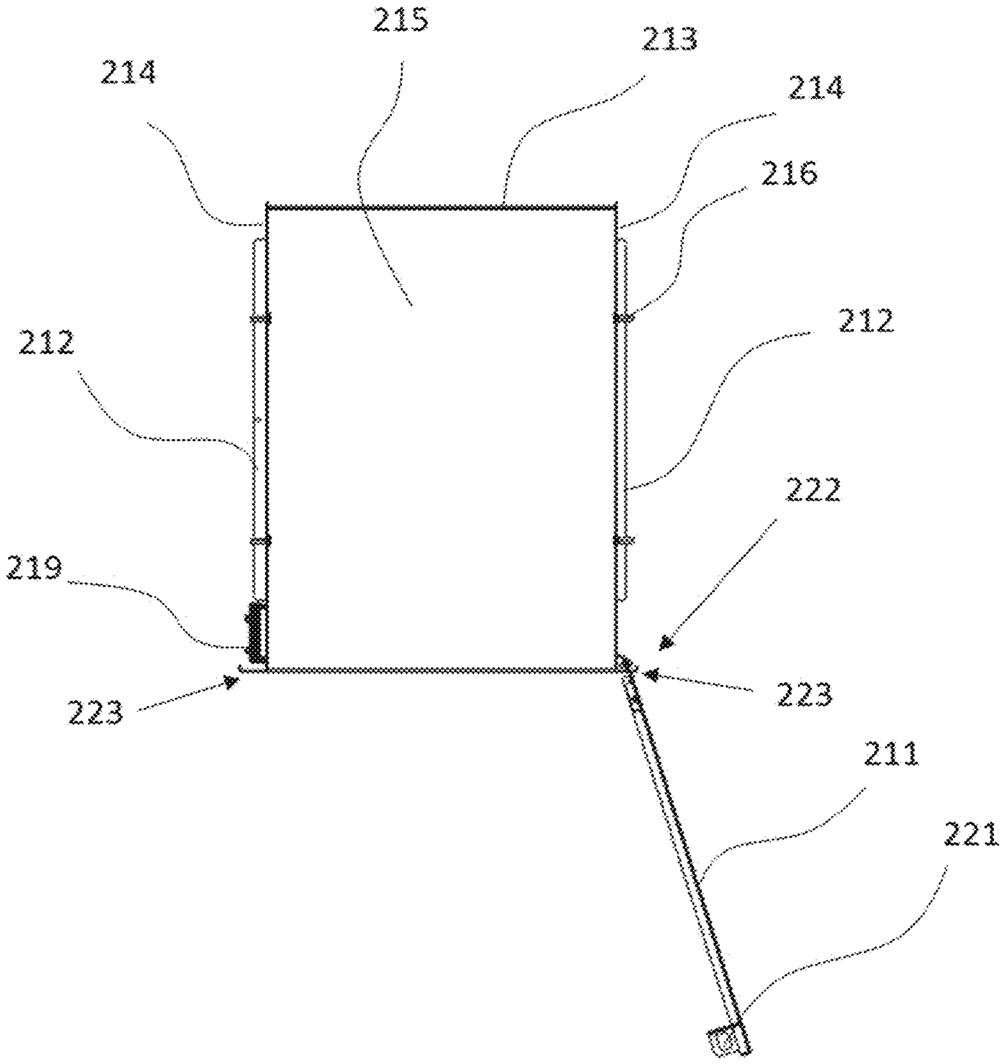
FIG. 10 is a top view of a storage bin with its front door open, the storage bin being separated from the other bins, according to a non-limiting embodiment.

FIG. 10 shows a top view of a separable storage bin 210 separated from the other bins with the front door 211 open, according to a non-limiting embodiment. Side plate brackets 223 can form "J" shapes near the side plates 214 to securely hold the cassette unit 200 including separable bins. The side plate brackets 223 are associated with cassette slide clips 169 to prevent horizontal moving of the cassette unit 200 including separable bins (see FIGS. 11-12 and 14-16). The door striker bracket 221 can be combined with the latch 219 through the latch slot 220 to lock the front door 211.

In some embodiments, to enhance front doors 211 opening, structures such as pushers or springs can be included around the front doors 211 or the side plates 214. The structures can be dependent on size or weight of each front door 211.

Figure 12:
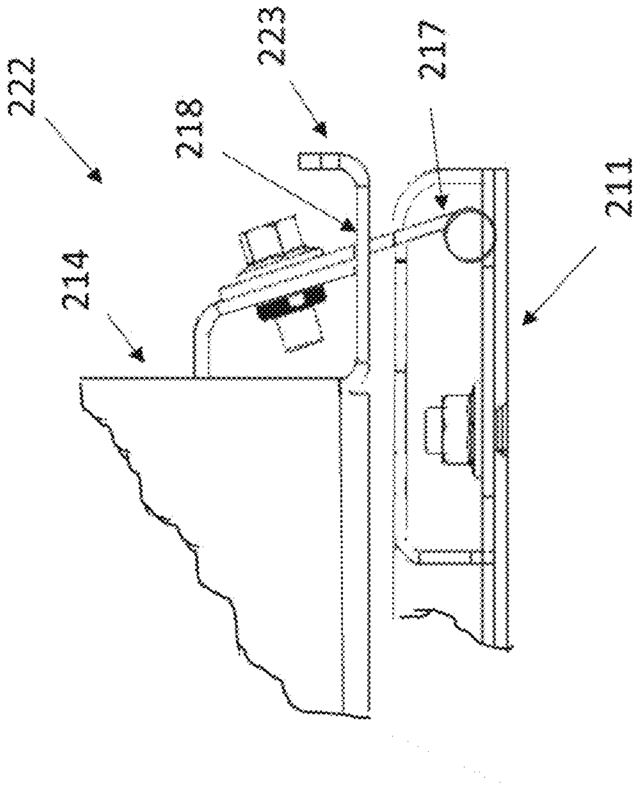
FIG. 12 is a detailed top view of an inside hinge structure of a storage bin when its front door is closed, according to a non-limiting embodiment.
Figure 11:
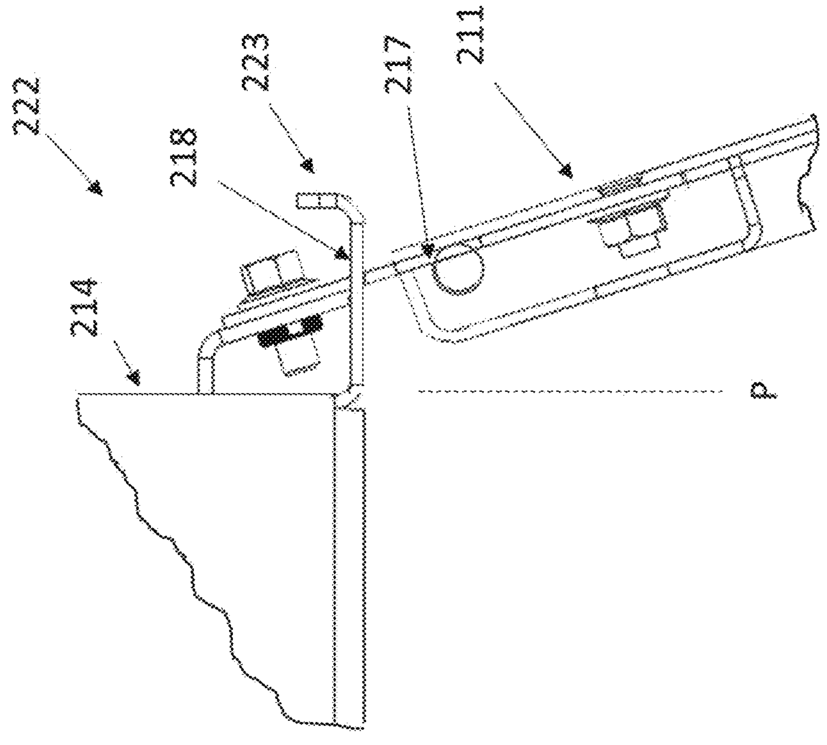
FIG. 11 is a detailed top view of an inside hinge structure of a storage bin when its front door is open, according to a non-limiting embodiment.

Referring to FIGS. 11 and 12, a detailed top view of a portion a hinge mount 222 is shown, according to a non-limiting embodiment. FIG. 11 shows the hinge mount 222 when the front door 211 is open. FIG. 12 shows the hinge mount 222 when the front door 211 is closed. The door hinge 217 passes through the hinge slot 218 and fixed to the side plate 214 using bolts and nuts. The side plate brackets 223 are inserted into the cassette slide clip 169, which is a part of the side wall 160.

Referring to FIG. 11, the front door 211 can move over dashed line "P" aligned with the side plate 214. The structure makes users convenient to store or pick up items without being blocked by the front door 211.

Referring to FIG. 12, the door hinge 217 is folded to close the front door 211. The front door 211 substantially covers the front opening of the cassette unit 200 without showing any fixtures or joints such as bolts, nuts and hinges. This appearance may help image capturing process simple (see step 500-510).

Figure 13:
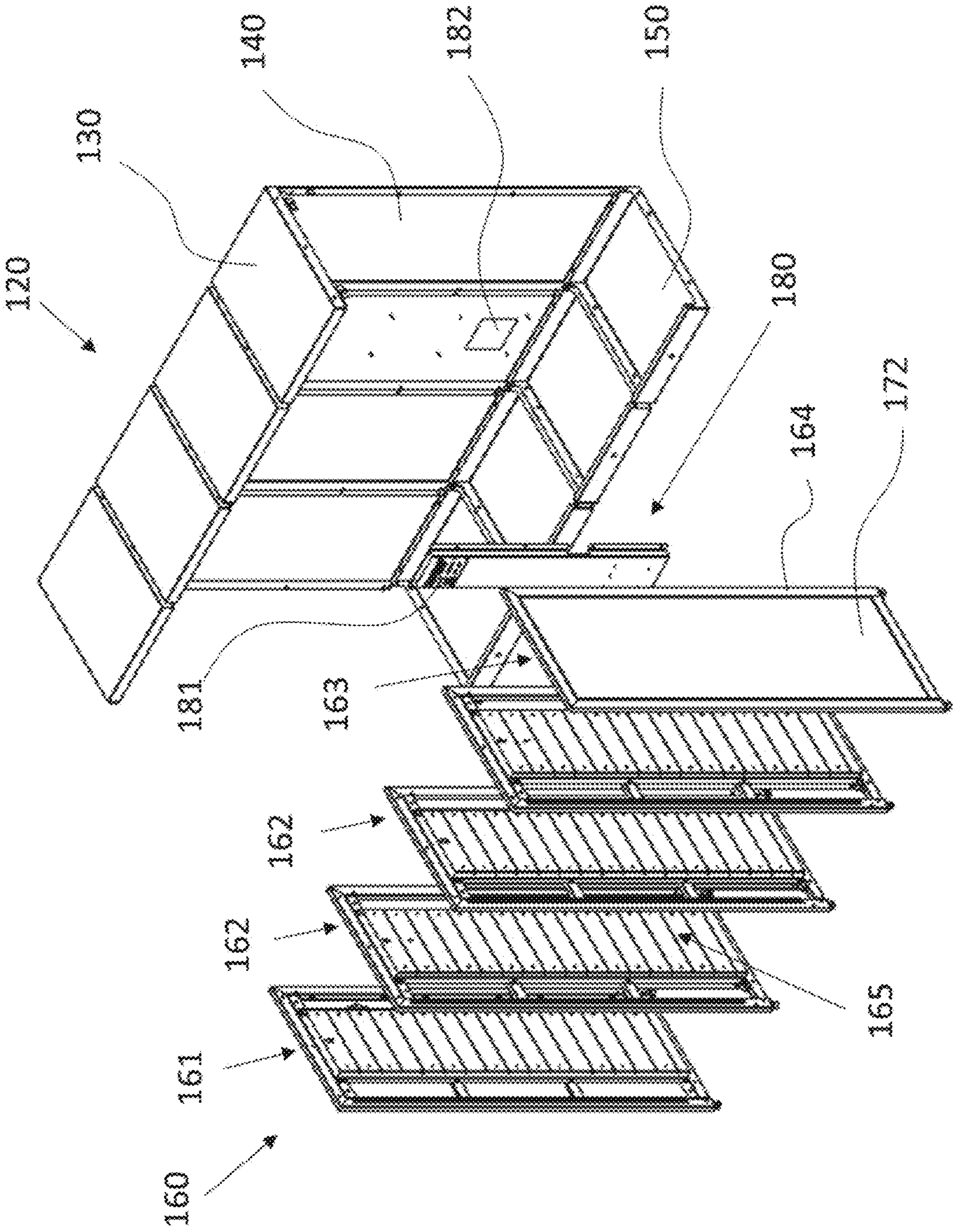
FIG. 13 is an exploded perspective view of an inside structure of a smart locker system accommodating cassette units with separable bins, according to a non-limiting embodiment.

FIG. 13 shows an exploded perspective view of an inside structure of a smart locker system 100 accommodating cassette unit 200 with separable bins, according to a non-limiting embodiment. The inside structure of the smart locker system 100 includes an enclosure unit 120 and a side wall 160. The enclosure unit 120 includes a top wall 130, a back wall 140 and a bottom wall 150. A side wall 160 includes a left outside wall unit 161, a right outside wall unit 163 and three inside wall units 162. A side skin 172 is included to the left outside wall unit 161 and to the right of the right outside wall unit 163.

To assemble the smart locker system 100, the outside wall unit 161 or 163 is attached to the enclosure unit 120 and the inside wall units 162 are inserted to build each bay module 110 in the enclosure unit 120. The smart locker system 100 is extendable by including additional enclosure units 120 and side walls 160.

The smart locker system 100 can include configurations for power and data communications such as a power and communication conduit 180, power and communication ports 181 and power and communication cutout 182.

Figure 14:
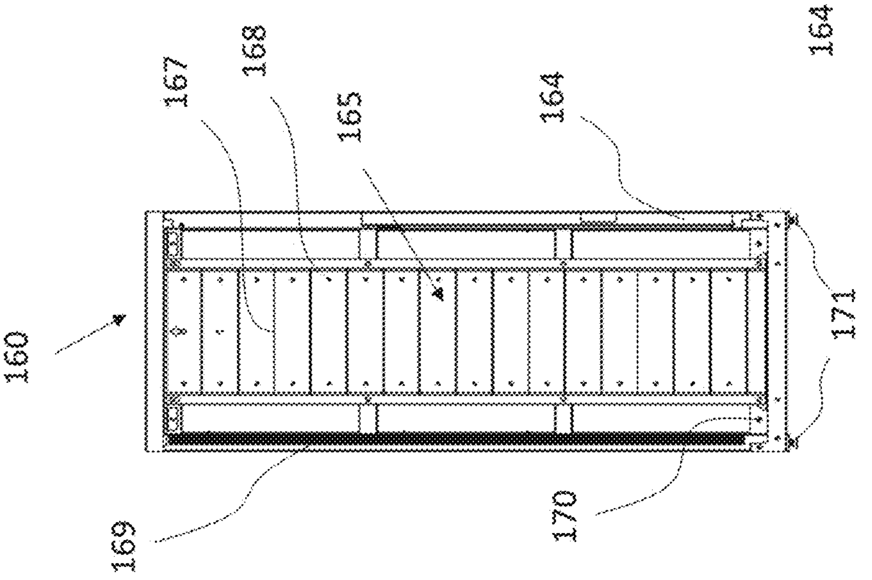
FIG. 14 is a side view of a structure of a side wall accommodating cassettes unit with separable bins, according to a non-limiting embodiment.

FIG. 14 shows a side view of a side wall 160 accommodating cassette unit 200 with separable bins, according to a non-limiting embodiment. The side wall 160 can include a rack frame 164, a rack plate 165 and a cassette slide clip 169. The rack plate 165 can include rack slots 167 to cooperate with side wings 212 in side plates 214. The rack plate 165 can also include rack holes 168 to hold the cassette unit 200 and wiring holes 170 to extend wiring for power and data communication. The side wall 160 can have levelling feet 270 at the bottom. A gap between the rack frame 164 and the rack plate 165 of side wall 160 can accommodate wirings for power and data communication to protect against wire damages during the smart locker assembly.

Figure 15:
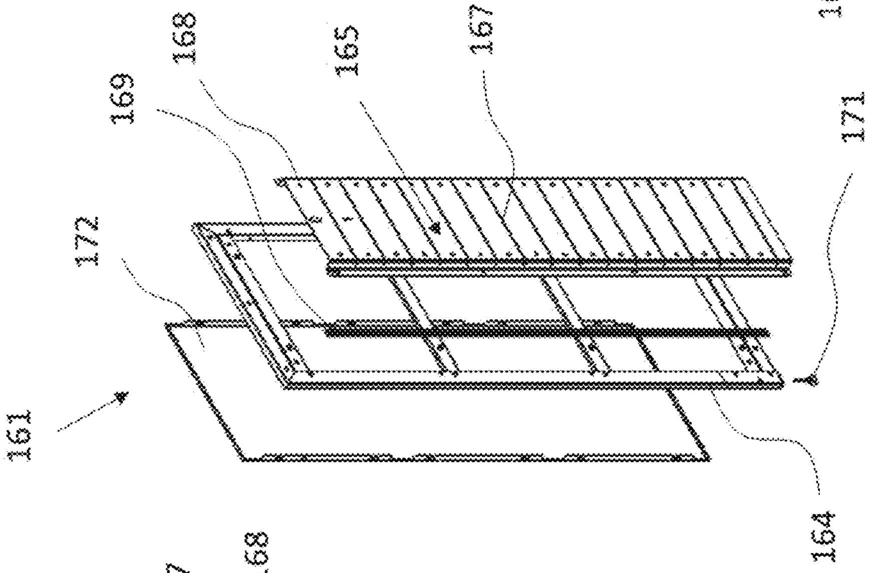
FIG. 15 is an exploded perspective view of an outside wall unit accommodating cassette units with separable bins, according to a non-limiting embodiment.

FIG. 15 shows an exploded view of a left outside wall unit 161 accommodating cassette unit 200 with separable bins, according to a non-limiting embodiment. The left outside wall unit 161 can include a side skin 172, a rack frame 164, a rack plate 165 and a cassette slide clip 169. In the present embodiment, the cassette slide dip 169 is installed on the right side of the rack frame 164 to couple with the left side of the side plate brackets 223 (see FIG. 10). In the case of a right outside wall unit 163, the cassette slide clip 169 is installed on the left side of the rack frame 164 to couple with the right side of the side plate brackets 223 (see FIG. 10 and FIG. 11).

Figure 16:
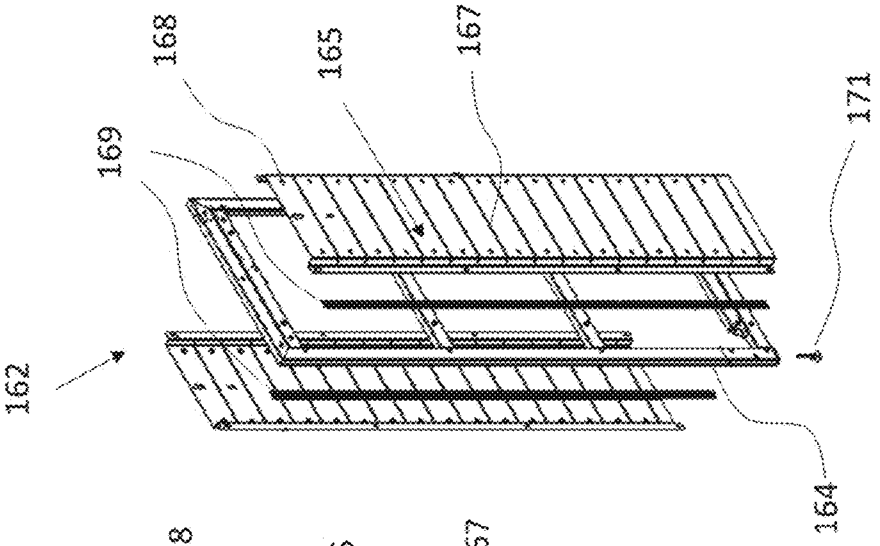
FIG. 16 is an exploded perspective view of an inside wall unit accommodating cassette units with separable bins, according to a non-limiting embodiment.

FIG. 16 shows an exploded view of an inside rack unit 162 accommodating cassette unit 200 with separable bins, according to a non-limiting embodiment. The inside rack unit 162 can include a rack frame 164, rack plates 165 and cassette slide clips 169. The cassette slide dips 169 are installed on the both side of the rack frame 164 to couple with the left side and the right side of the side plate brackets 223 (see FIG. 10).

FIGS. 17-20 show a structure of a smart locker system 100 with cassette unit 200 including combinable bins, according to a non-limiting embodiment. In the embodiment, the cassette unit 200 has different structure including combinable bins compared to the structure including separable bins as explained in FIG. 2.

Referring to FIG. 17, the cassette unit 200 includes combinable bins which are defined by side plates 214 and base plates 215 to accommodate configurations with front doors 211. One of the side plates 214 includes latches 219 and latch slots 220. The storage bins 210 may have different heights or depths as explained previously. The control bin 330 can include user interface devices such as a touch screen 340, authentication devices 341 and a computing unit (not shown). The cassette unit 200 is assembled with the enclosure unit 120 forming bay module 110. Side plate handles 343 can be attached to the side plates 214 to easily assemble the cassette unit 200 with the enclosure unit 120.

Figure 18:
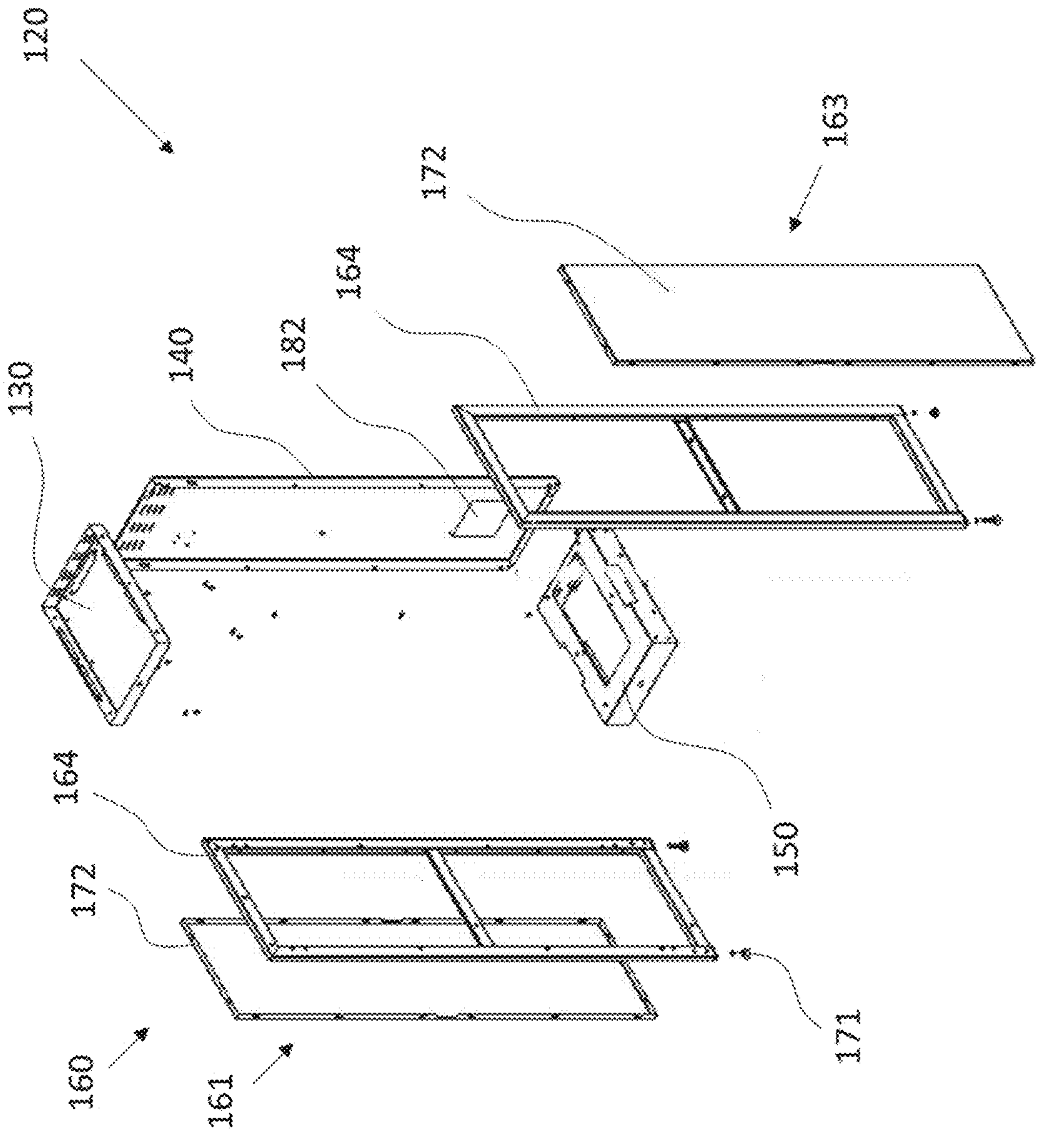
FIG. 18 is an exploded perspective view of an enclosure unit accommodating a cassette unit, with combinable bins, according to a non-limiting embodiment.

Referring to FIG. 18, the enclosure unit 120 includes side walls 160 which contain a left outside wall unit 161 and a right outside wall unit 163. Side skins 172 are attached to the left outside wall unit 161 and to the right of the right outside wall unit 163. The smart locker system 100 can be extended by including additional enclosure units 120 and side walls 160 or adding bay modules 110 (see FIG. 20). When combining the bay modules 110, inside wall units (not shown) can be added. The side skins on inside wall units can be removed may not include side skins 172.

Figure 19:
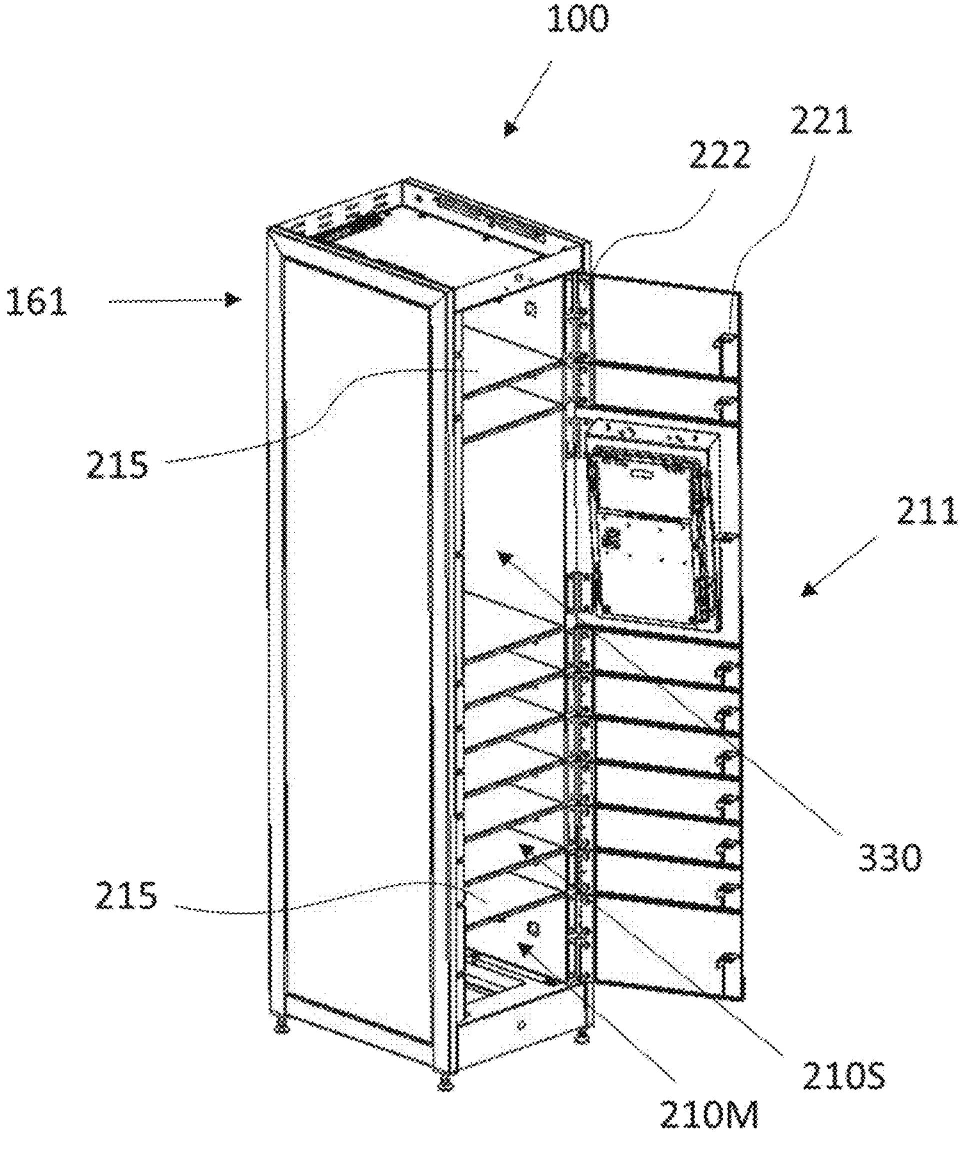
FIG. 19 is a perspective view of a smart locker system accommodating a cassette unit with combinable bins, according to a non-limiting embodiment.

FIG. 19 shows the smart locker system 100 accommodating one bay module 110 with opened front doors 211, according to a non-limiting embodiment. In the embodiment, the base plates 215 define the height of the storage bins 210 and the control bin 330. Hence the bay module 110 contains two medium storage bins 210M, seven small storage bins 210S and one control bin 330.

Figure 20:
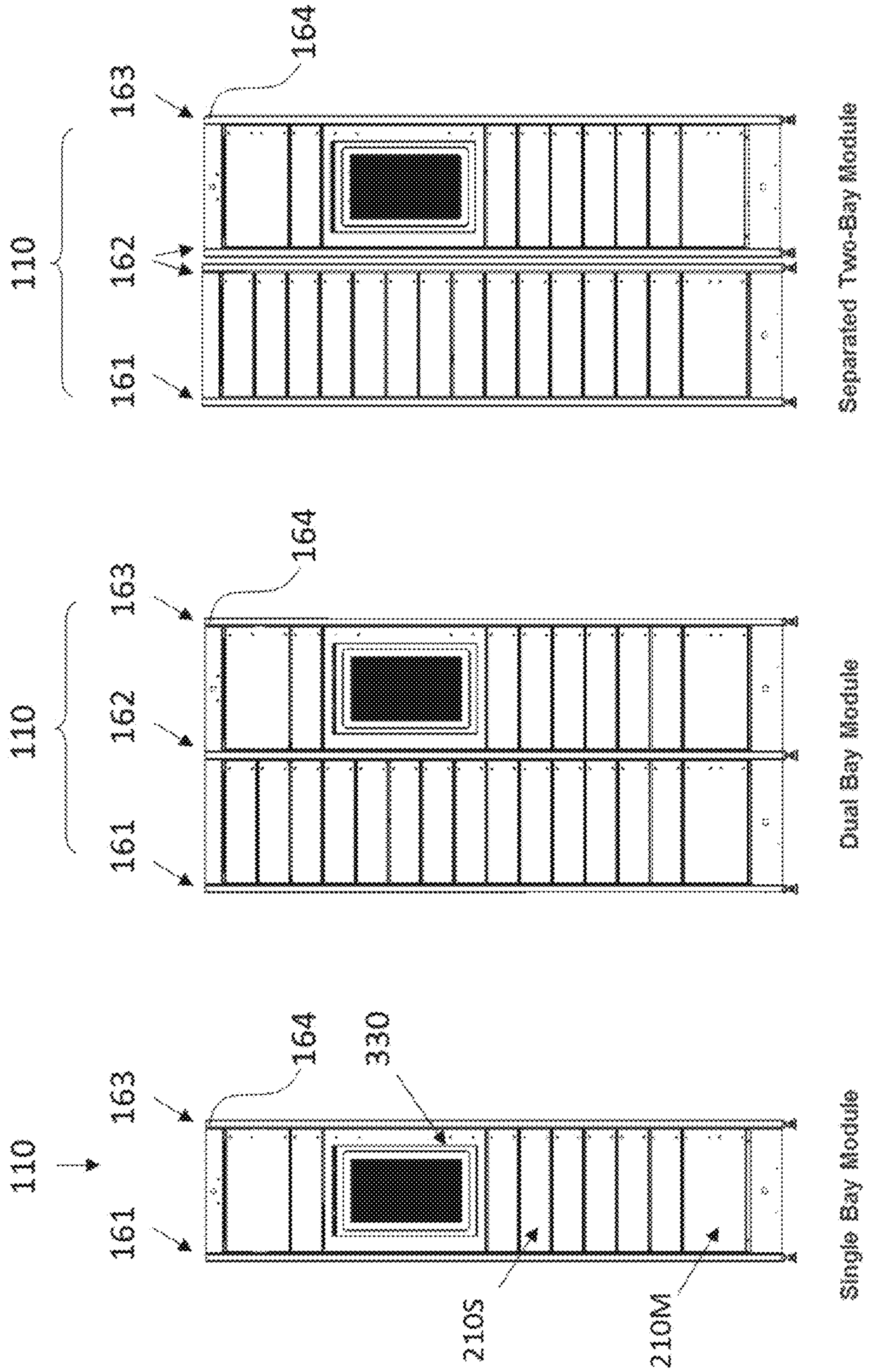
FIG. 20 shows front elevation views of various arrangement of bay modules with cassette units including combinable bins, according to non-limiting embodiments.

Referring to FIG. 20, the smart locker system 100 can be extended by adding bay modules 110, according to a non-limiting embodiment. The bay modules 110 can be placed either separately or unitedly depending on customer's configurations. For example, dual bay module shares the inside wall unit 162 whereas separated two-bay module has each side wall units 162. The separated two-bay module can also be combined with each other using fasteners such as bolts and nuts.

Figure 21:
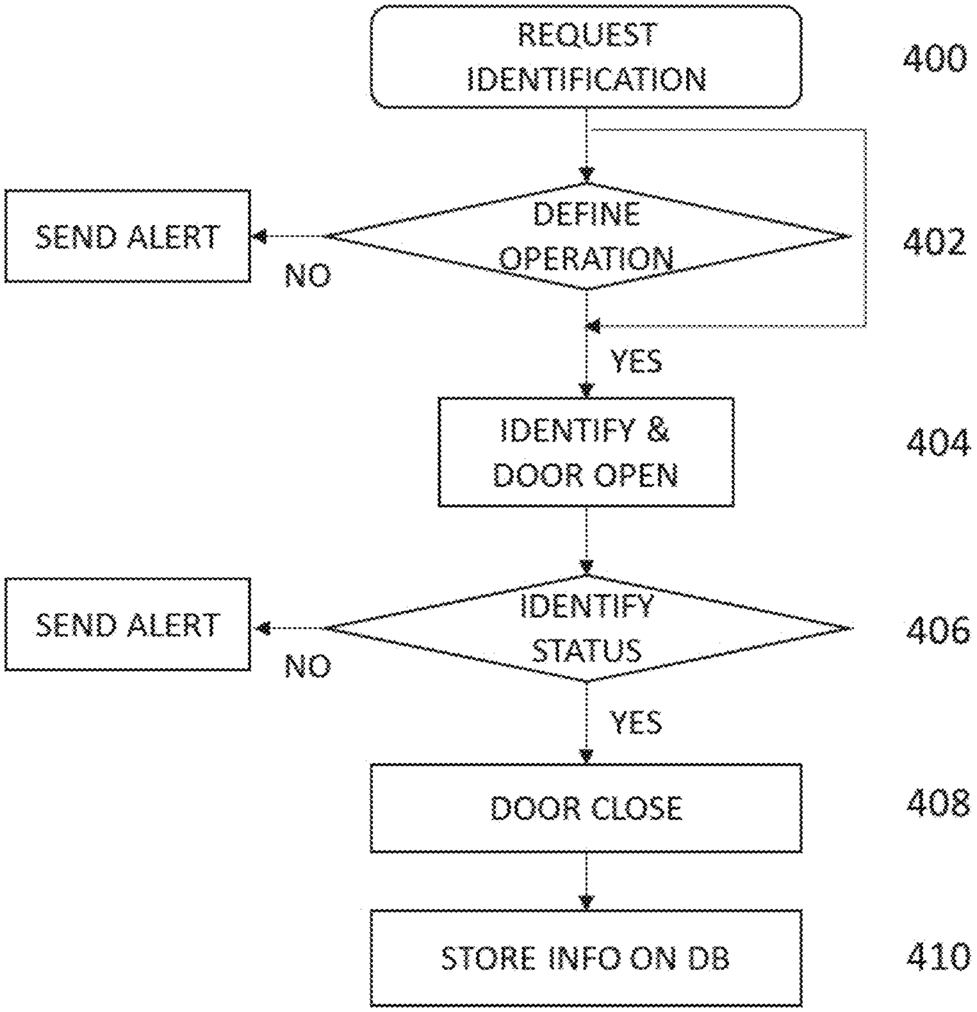
FIG. 21 is a flowchart illustrating a method for operating a smart locker system for stocking or delivering an item, according to a non-limiting embodiment.

FIG. 21 shows an example method of operating the smart locker system 100, according to a non-limiting embodiment. The operation can include both storing and delivering items. It is emphasized that the method may be performed with other systems and devices and that the steps need not be performed in the exact sequence as shown. The method may be instantiated on a non-transitory machine-readable storage medium which, when executed, causes a processor of a computing device to execute the method or any steps thereof.

At step 400, a control bin 330 requests identification of a user's access to store or pick up an item. In various embodiments, a user can use a touch screen 340 and/or authentication devices 341 to provide identification to access the smart locker system 100. When a user has specific access information such as barcode or QR code or numeric code, the access information is sent to a computing unit directly and the user may skip step 402. When a user uses identification such as ID card, it follows step 402.

In some embodiments, a webcam can recognize barcode or QR code or an image of an item to be stored.

At step 402, the user interface of the control bin 330 asks the user to define a requested operation. In various embodiments, when a user uses identification such as ID card, the user interface of the control bin may ask next questions including operation types (e.g. stock/pickup) and item selections (e.g. reserved/new, size/weight). The user can select a proper menu on the touch screen 340 such as item size to store the item inside a storage bin 210. The touch screen 340 and the authentication devices 341 send input data to a computing unit. If the data is not matched with database, the computing unit can send alert through user interface devices such as a touch screen 340 or a smart speaker and can connect a related operator or a responsible manager to address the situation.

At step 404, a computing unit can send signal to make a door striker bracket 221 released from a latch 219 located in the storage bin 210, identifying a user and an item to process operations. In various embodiments, the computing unit identifies input data of the user and the item and may send signal to a latch 219 located in the storage bin 210 designated by the computing unit and the latch 219 releases a door striker bracket 221 from a latch slot 220. Then, the front door 211 is open to store or deliver the item. In case of storing an item, the computing unit designates a proper storage bin 210 to be open based on the input data at step 402. LED lighting can illuminate inside or outside of the storage bin 210 while the front door 211 is open.

At step 406, a computing unit identifies the status of storing or delivering an item. In various embodiments, sensors or cameras that may be located around the smart locker system 100 may identify if the storage/delivery of an item was successfully executed. For example, RFID reader can be used to detect an item with RFID tag. A camera can also picture the image of an item.

If the storage/delivery of an item was not proper, the smart locker system 100 can alert a customer. For example, when a user does not place an item inside the storage bin 210 after a predetermined time interval, the smart locker system 100 can issue customer reminders such as flashing LED light or changing LED light color or alerting sounds or voices. When a user leaves an item inside the storage bin 210 after a predetermined time interval, the smart locker system 100 can issue customer reminders such as flashing LED light or changing LED light color or alerting sounds or voices. If the user left the location of the smart locker system 100, the computing unit can send alert to the user through a mobile device.

At step 408, it is optional for the front door 211 closing after picking up an item. However, the front door 211 is closed after storing an item inside the storage bin 210. In various embodiments, the front door may be closed by a user or a moving mechanism such as motors and gears.

At step 410, a computing unit stores information of storing or delivering an item on database. In various embodiments, the information can be stored in the memory of the computing unit or stored in the memory of cloud system in communication with the computing unit. The stored information on database can be used for next operations.

Figure 22:
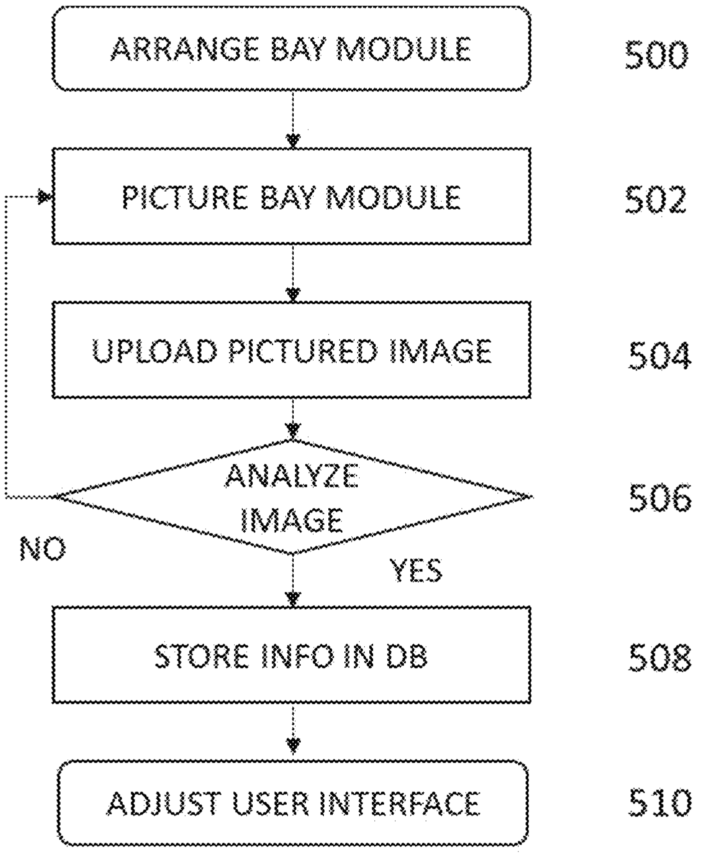
FIG. 22 is a flowchart illustrating a method for managing cassette unit arrangement using mobile devices, according to non-limiting embodiment.

FIG. 22 shows an example method of managing cassette unit 200 arrangement, according to a non-limiting embodiment. It is emphasized that the method may be performed with other systems and devices and that the steps need not be performed in the exact sequence as shown. The method may be instantiated on a non-transitory machine-readable storage medium which, when executed, causes a processor of a computing device to execute the method or any steps thereof.

At step 500, an operator arranges cassette units 200 and/or bay modules 110. The cassette units 200 and/or bay modules 110 may be arranged for the purpose of efficient and flexible operation. In various embodiments, an operator can arrange cassette units 200 including storage bins 210 and control bins 330 properly. An operator can also arrange bay modules 110 including cassette units 200. For example, when the smart locker system 100 requires to accommodate small items, the cassette units 200 include more small storage bins 210S. When the smart locker system 100 needs to comply with ADA (the Americans with Disabilities Act), a control bin 330 can be moved down to the height between 48 inches and 15 inches.

At step 502, an operator captures a picture of the smart locker system 100 with a mobile device. In various embodiments, an operator can capture a picture of the smart locker system 100 having arrangements on cassette units 200 or bay modules 110 in front of the smart locker system 100 with a mobile device.

At step 504, an operator uploads the pictured image of the smart locker system 100 with a mobile device, using a software application (i.e. an "app") for analyzing images. The software application may be instantiated in a non-transitory machine-readable storage medium. In various embodiments, an operator can upload the pictured image of the smart locker system 100 having arrangements on cassette units 200 or bay modules 110, using an app for analyzing images.

At step 506, an app analyzes the pictured image of the smart locker system 100. In various embodiments, the app executes some processes such as extracting patterns from the pictured image of the smart locker system 100 and comparing the patterns with patterns stored in database. As shown in FIG. 1, the rack frames 164 and the front doors 211 define the patterns which include mostly strips and rectangular shapes. The rack frames 164 define the number of bay modules 110 and the height of the front doors 211 define the number of cassette unit 200 as well as the size of cassette unit 200. For example, as shown in FIG. 1, the pictured image of the smart locker system 100 has five vertical strips that are analyzed into four bay modules 110. The control bin 330 can be identified because the pattern of the control bin 330 has a square shape including small rectangles such as a touch screen 340 and authentication devices 341.

In some occasions, the front door 211 may have designs/patterns such as logos or images for decoration. The app may have a function to eliminate the unwanted designs/patterns on the front door 211. Various bay modules 110 as shown in FIG. 20 can be also analyzed by pattern recognition process. If the pictured image is not correct, the app may require another pictured image. Thus, the app may employ machine vision and/or image recognition techniques to identify the arrangement of cassette units 200 and/or bay modules 110 and the bins 210 thereof.

At step 508, the computing unit stores the information of the cassette unit arrangement on database. In various embodiments, the computing unit stores the information of arrangements on cassette units 200 or bay modules 110 processed by the app. The information can be stored in the memory of the computing unit or stored in the memory of cloud system in communication with a mobile device.

At step 510, the user interface on touch screen 340 is updated based on the information on database. In various embodiments, the configuration of user interface on touch screen 340 is constructed newly after updating the information on database.

Thus, operators of the smart locker system 100 may easily update the user interface of the smart locker system 100 to accurately reflect the configuration of the cassette units 200, bay modules 110, and storage bins 210 of the smart locker system 100, and users of the smart locker system 100 may be provided with updated information as to the configuration of the cassette units 200, bay modules 110, and storage bins 210 of the smart locker system 100 through the user interface thereof.

Additionally, the smart locker system 100 can have a method for opening selected front doors 211 at once to manage operation efficiently. For example, in BOPIS (Buy Online Pickup In-Store) business sector, an operator can open all front doors 211 at once to stock items efficiently using user interface on the touch screen 340. All front doors along with column/row can be open according to user interface programing. Selected front doors 211 such as the front doors 211 at empty storage bins 210 also can be open at once according to user interface and programing. That is, in response to an authorized access request (for example received at the user interface), the computing unit may send data signals to the respective lock devices of respective front doors of the selected storage bins (e.g., the storage bins associated with a certain bay module, or another selected/identified subset of the storage bins in the locker system 100) to open the respective front doors simultaneously.

In some embodiments, the front doors 211 can be open using manual key locks 184 by operators. For example, the locker system 100 may include a release mechanism associated with each bay module 110. The release mechanism may be configured to simultaneously open the front doors of each of the separable storage bins 210 associated with the bay module simultaneously. In particular, the release mechanism may include a support bar having protruded pins and the key lock 184 to activate the protruded pins. When the protruded pins may be configured to interface with the latches 219 and the releasing knobs such that when an operator turns the key lock 184, the support bar moves the protruded pins to lift the releasing knobs, thereby releasing the latches 219 from their respective door striker brackets 221 and opening all the front doors 211 simultaneously.

The scope of the claims should not be limited by the embodiments set forth in the above examples, but should be given the broadest interpretation consistent with the description as a whole.

The invention claimed is:

1. A locker system comprising:
- at least one enclosure unit including at least one top wall, at least one back wall, at least one bottom wall and at least one side wall;
- at least one cassette unit coupled with the at least one enclosure unit, the at least one cassette unit comprising:
  - at least one storage bin to store items, each storage bin including a front door and a lock device to secure the front door; and
  - at least one control bin including a computing unit including at least one processor, the computing unit connected to an outside network and configured to:
    - send a data signal to the lock device to open the front door;
    - receive a response from a sensor switch at the lock device;
    - when the response comprises a reverse data signal, identify an opening failure; and
    - in response to identifying the opening failure, output an alert signal for an operator of the locker system.

2. The locker system of claim 1, wherein, in response to identifying the opening failure, the computing device is configured to send a further data signal to the lock device to open the front door.

3. The locker system of claim 1, wherein the lock device comprises:
- a latch to interface with a door striker bracket to lock the front door; and
- a latch controller configured to, in response to the data signal received from the computing device; release the latch from the door striker bracket to open the front door.

4. The locker system of claim 1, further comprising an environmental conditioning system to maintain a temperature of the at least one storage bin.

5. The locker system of claim 4, wherein the environmental conditioning system comprises a thermoelectric device associated with the at least one storage bin.

6. The locker system of claim 5, wherein the thermoelectric device comprises a Peltier module.

7. The locker system of claim 5, wherein the environmental conditioning system further comprises a temperature controller to control the thermoelectric device to maintain the temperature of the at least one storage bin.

8. The locker system of claim 4, wherein the at least one storage bin further comprises insulated plates.

9. The locker system of claim 1, wherein the at least one storage bin further comprises vent components to control dust and moisture in the at least one storage bin.

10. The locker system of claim 9, wherein the at least one storage bin further comprises a gasket and an air flow membrane to maintain air pressure in the at least one storage bin.

11. The locker system of claim 1, wherein the at least one storage bin further comprises a drain to drain condensation from the at least one storage bin.

12. The locker system of claim 1, wherein the at least one storage bin further comprises a sanitation device configured to sanitize an interior of the at least one storage bin.

13. The locker system of claim 12, wherein the sanitation device is configured to turn off in response to the front door opening.

14. The locker system of claim 1, further comprising a release mechanism to manually open all front doors along with at least one bay module simultaneously.

15. The locker system of claim 14 wherein the release mechanism comprises a support bar having protruded pins configured to interface with each lock device of each of the at least one storage bin associated with the bay module and a key lock to activate the protruded pins.

16. A method for operating a locker system, the method comprising:
- in response to an access request, sending, from a computing device, a data signal to a lock device of a front door of a storage bin to open the front door;
- receiving a response from a sensor switch at the lock device;
- when the response comprises a reverse data signal, identifying an opening failure; and in response to identifying the opening failure, outputting an alert signal for an operator of the locker system.

17. The method of claim 16, further comprising, in response to the access request:

selecting further storage bins to access; and simultaneously with sending the data signal, sending further data signals to respective lock devices of respective front doors of the further storage bins to open the respective front doors simultaneously with the front door of the storage bin.

18. The method of claim 17, wherein the storage bin and the further storage bin are associated with a cassette unit.

19. The method of claim 16, further comprising:

when the response comprises a data signal, identifying an opening success; and in response to identifying the opening success, controlling a lighting unit to illuminate the storage bin.

20. The method of claim 16, further comprising, in response to identifying the opening failure, sending a further data signal to the lock device to open the front door.

* * * * *